United States Patent [19]

Moss

[11] 3,768,677
[45] Oct. 30, 1973

[54] BOAT TRAILER
[75] Inventor: Louie W. Moss, Niceville, Fla.
[73] Assignee: Drydock Trailers, Inc., Niceville, Fla.
[22] Filed: Mar. 27, 1972
[21] Appl. No.: 238,095

[52] U.S. Cl............ 214/506, 280/43.19, 280/43.11, 280/43.18, 280/414 R, 280/414 A
[51] Int. Cl............................................. B60p 1/04
[58] Field of Search.................... 214/506; 298/5; 280/414 R, 43.19, 414 A, 43.11, 43.18

[56] References Cited
UNITED STATES PATENTS

| | | | |
|---|---|---|---|
| 2,453,338 | 11/1948 | Schramm | 280/43.18 |
| 2,740,639 | 4/1936 | Eckroad | 280/43.11 |
| 2,905,481 | 9/1959 | Schramm | 280/43.11 X |
| 2,957,593 | 10/1960 | Evans | 214/506 |
| 3,056,610 | 10/1962 | Massey | 280/43.18 |
| 3,414,149 | 12/1968 | Nelson et al. | 214/506 |

Primary Examiner—Gerald M. Forlenza
Assistant Examiner—R. Johnson
Attorney—Edwin M. Thomas

[57] ABSTRACT

The invention disclosed is a boat trailer adapted to be towed by an automobile or other vehicle and having one or more pairs of wheels, each wheel being mounted eccentrically on an independently rotatable axle. Lever and linking means are provided for rotating each axle separately to raise and lower the body of the trailer, facilitating boat loading and launching. For normal support of a boat during travel, adjustable padded bolsters of large contact area are provided. An auxiliary boat support means is provided to lift the boat off the bolsters on rotation of the axle as the trailer is lowered. The lifting mechanism is locked in raised position for travel. The lift mechanism includes a resilient connection for each wheel, providing independent suspension. The elevating mechanism is operated by a winch which also can be used to pull the boat onto the trailer.

10 Claims, 9 Drawing Figures

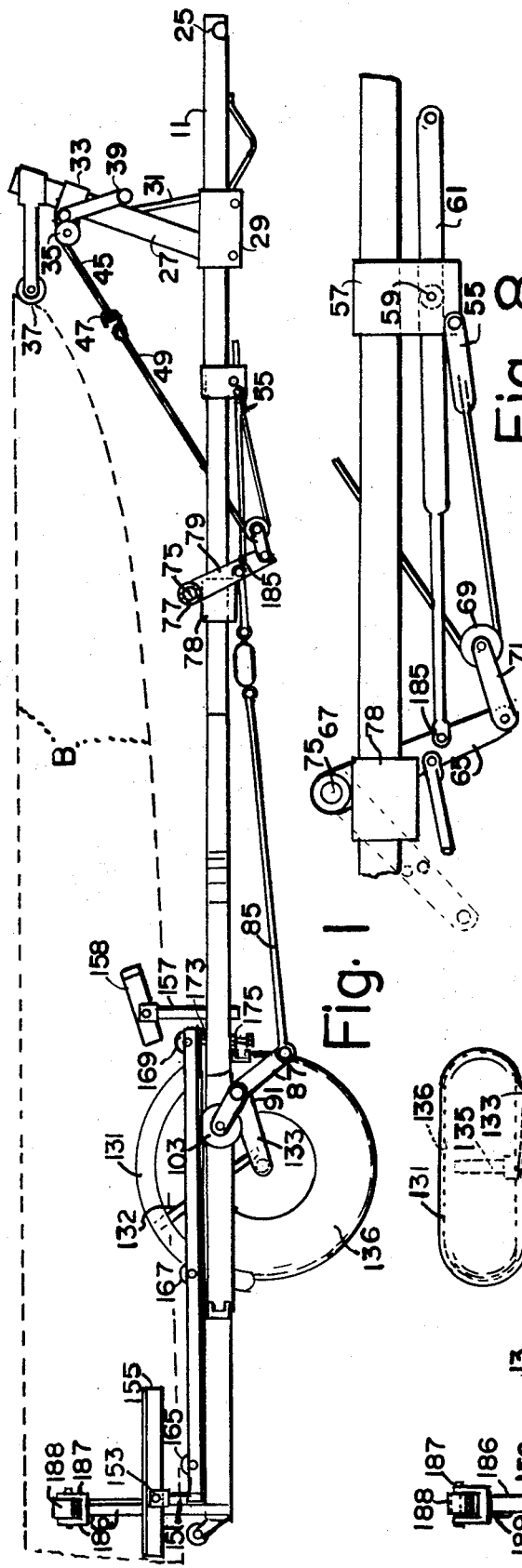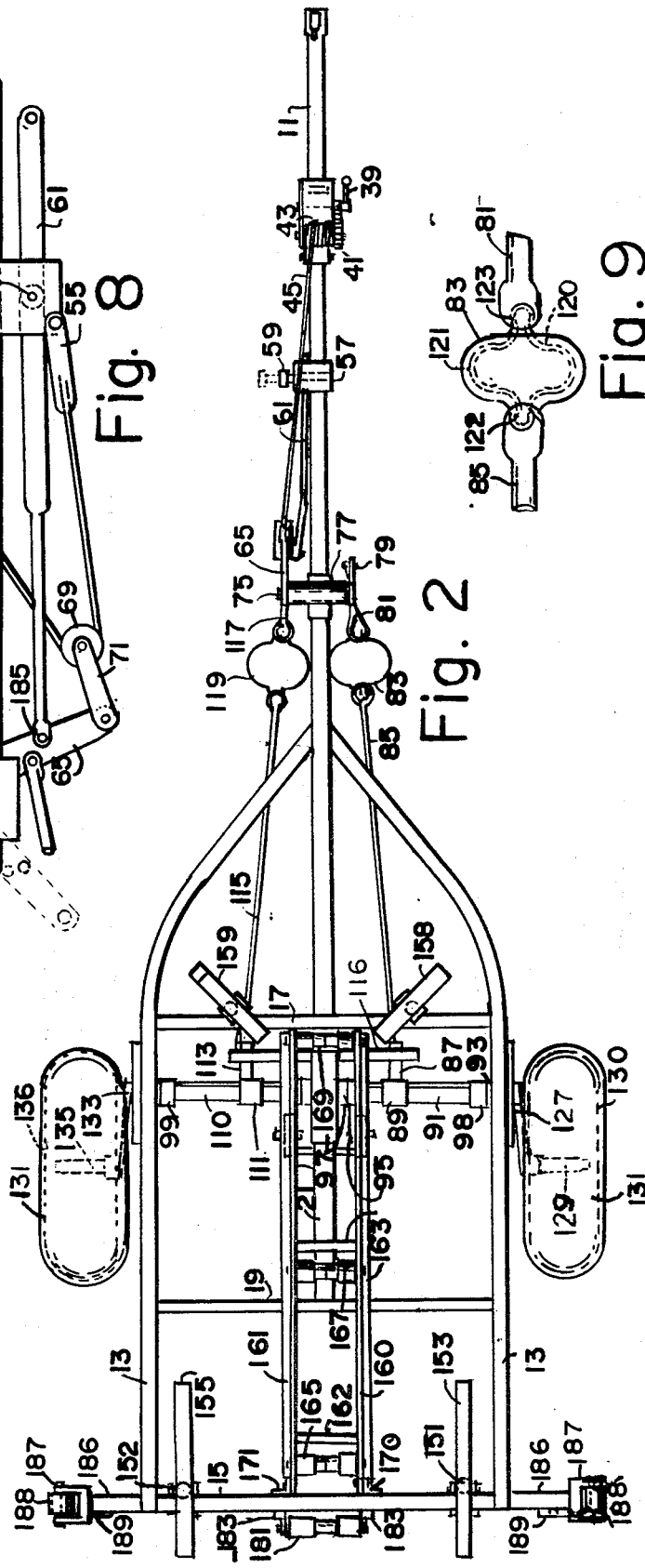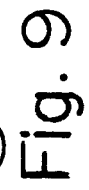

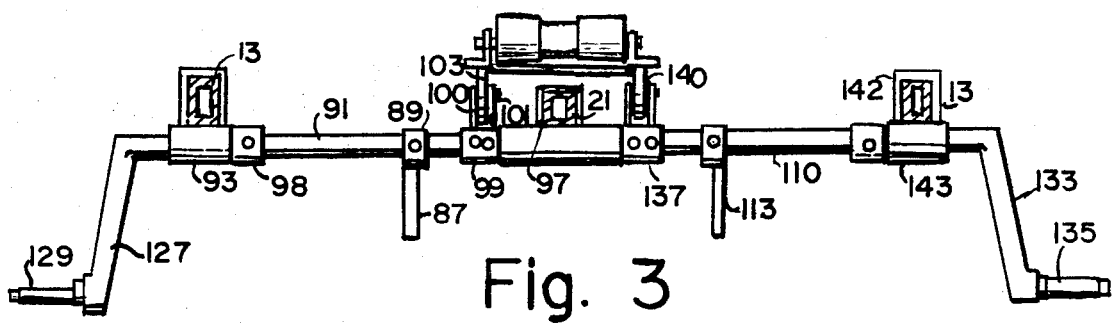
Fig. 3
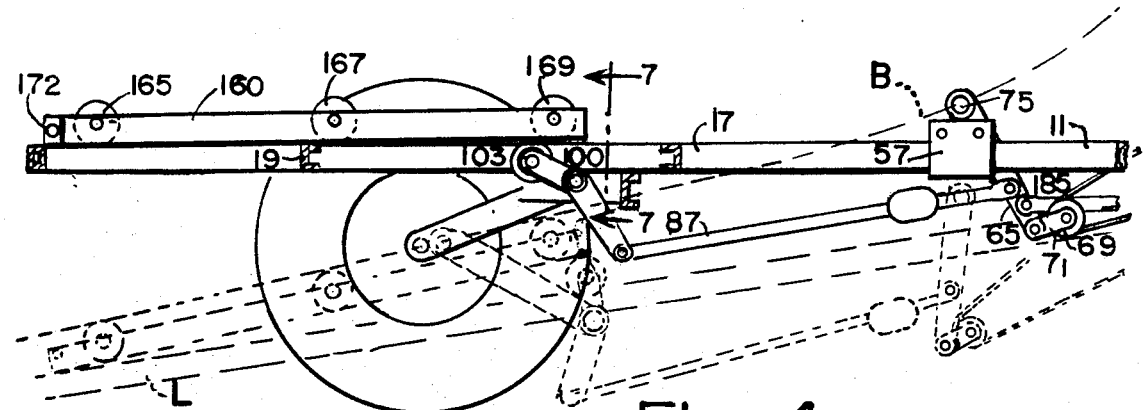
Fig. 4
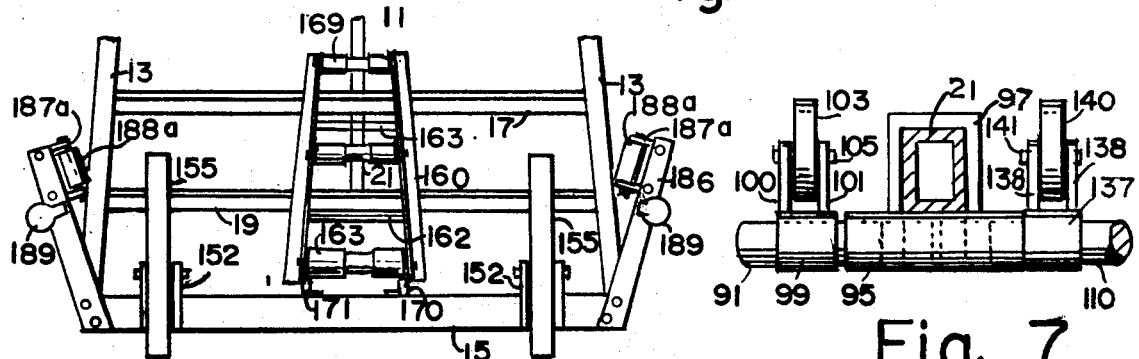
Fig. 5
Fig. 7
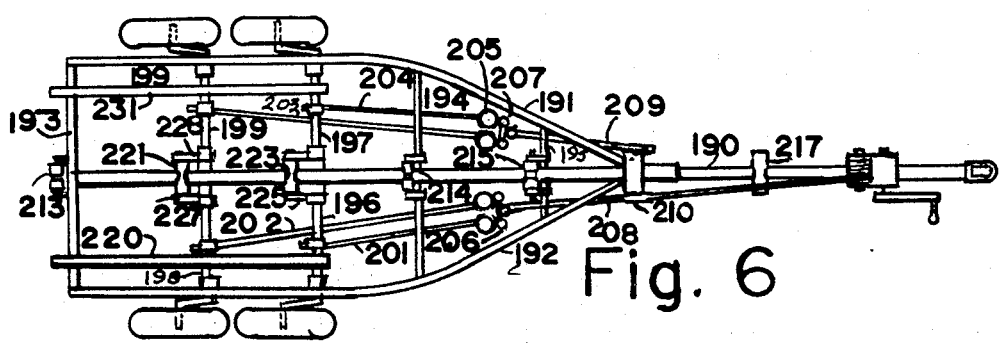
Fig. 6

BOAT TRAILER

BACKGROUND AND PRIOR ART

Many types and sizes of trailers adapted to be towed by automobiles and similar vehicles are available for transporting boats to and from water where the boat is used. Some of the smaller trailers are simple and relatively inexpensive. Where boats can be lifted manually to and from the trailer, these are very useful. For heavier boats, which cannot be handled manually, trailers which have been provided in the prior art are either very heavy, complex and correspondingly costly or they are deficient in operability or reliability.

Expect for very small boats, it often takes several men to launch and reload a boat from a trailer unless special boat loading or unloading mechanism is provided. While many marinas and other shore facilities provide boat handling services, these are not universally available and may be quite expensive. It is obviously desirable to have a boat trailer capable of handling boats of considerable size by means of which a single operator can launch or reload the boat without assistance. It has been proposed in the prior art to construct trailers so they can be raised and lowered by various means, such as block and tackle, levers, hydraulic mechanisms, winches, etc. Some of these mechanisms are complex and expensive, some of the less expensive are not reliable. It is obviously necessary to have a trailer construction which is stable, which will travel on rough roads without buckling or collapsing and which, at the same time, is reasonably economical in cost.

A number of proposals have been made to mount the wheels which support the trailer on arms attached to rigid transverse shafts or axles which can be rocked or rotated to raise or lower the trailer frame with respect to the wheels. Examples of these are seen in U.S. Pat. Nos. 2,496,599, 2,830,718, 2,835,399, and 2,895,627. The first mentioned describes a trailer having a rigid cross axle which is rotatable to raise and lower the trailer by depressing or raising the wheels with respect to the trailer body. The individual wheels in this case are mounted on arms which are resiliently connected to the rigid cross axle. In this particular disclosure, the front end of the trailer and the rear end as well, must be lowered to the ground. The resilient wheel mountings of this type tend to be complex and relatively costly. Rocking of the main cross axle when effected by a pulling of block and tackle mechanism may provide only partial control of the wheels; for example, they may be lowered and become unstable for travel over rough roads. A hydraulic control mechanism, such as shown in U.S. Pat. No. 2,835,399 appears to be better in this respect but is, of course, a relatively expensive mechanism. The trailers described in all of the references just mentioned, have a main cross axle as one rigid unit.

It is obviously desirable that the boat be supported during travel on contact members which do not damage the boat in any respect. In many cases, trailer manufacturers have provided large area bolsters for this purpose, padded to protect the boat from damage, etc. In some cases, also, lift mechanisms have been provided to transfer the weight of the boat off the normal travel bolsters onto other mechanism for launching. The present invention includes such a feature. It is obviously desirable that such a lift mechanism be simple and efficient in operation. Preferably its operation should be coordinated with that of raising or lowering the trailer with respect to the ground. While various mechanisms are available in the prior art for performing all or most all of these functions, it is particularly desirable that the whole trailer be kept relatively simple and trouble-free while at the same time maintaining firm control at all times over the wheels on which it rides. Some provision needs to be made to absorb road shock imparted to the wheels by travel over rough or rocky raods. In the prior art, a number of such arrangements are known. Usually a compromise must be made between firmness or rigid stability of the mechanism and provision of spring support. The present invention uses an extremely simple means to provide reasonable shock absorption in the suspension system.

Primary objects of the present invention are to meet the requirements for safe, efficient and economical boat transportation by use of mechanism which is extremely or at least relatively simple in all its operations, which is relatively inexpensive to fabricate, which provides reasonable shock absorption during travel, and which maintains a high degree of control over the wheels at all times. This system of the present invention can be incorporated in a simple two-wheel trailer, which is normally preferred; for larger boats it can also be incorporated without substantial increase in cost in tandem type or four-wheel trailers.

BRIEF DESCRIPTION OF DRAWINGS

FIG. 1 shows a side view of a preferred form of trailer, certain parts being omitted or broken away to show the construction more fully.

FIG. 2 is a top or plan view of the trailer of FIG. 1.

FIG. 3 is a view on larger scale of the axle assembly and certain related components, some parts being shown in section.

FIG. 4 is a schematic view of the main lifting mechanism, illustrating the operation of the mechanism between high and low positions.

FIG. 5 is a rear end view, partly in perspective, of the trailer of FIGS. 1–4.

FIG. 6 is a plan view of a modified four-wheel or tandem type trailer.

FIG. 7 is an enlarged cross-sectional detail taken substantially along lines 7—7 of FIG. 4.

FIG. 8 is an enlarged fragmentary side view showing certain details of a safety locking mechanism.

FIG. 9 is an enlarged top view of a shock absorbing element, which is included in the control linkage for each wheel.

DESCRIPTION OF PREFERRED EMBODIMENT

Referring first to the FIGS. 1 and 2, the trailer of the present invention has a main frame consisting of an elongated tongue member 11 and spaced side rail members 13 and 15, each of which is curved so as to converge and join the tongue at their forward ends. These parts are secured together by suitable welding not shown in detail. A transverse rear member 15 joins the side members 13 together at the rear ends and intermediate bracing members 17 and 19 also are provided to connect the side members together. Member 17 is also connected at its middle to the rear end of the tongue 11. A brace member 21, which in effect is an extension of the tongue, is fitted between the transverse braces 17 and 19 to reinforce them and to provide support for certain other parts. The tongue 11, the main side members 13, and in heavier trailers, the rear frame member 19, preferably are formed of hollow tubular construction, rectangular in cross-section. The other members may be channel bars, I-beams or angle bars as desired. The parts are all secured together to provide a rigid and strong frame construction in a manner well known in the prior art.

At its forward end, the tongue 11 is provided with a trailer hitch 25 of conventional type by means of which it can be attached to a towing vehicle. An upright standard 27 is mounted on a bracket 29 of inverted U-shaped cross-section which is clamped firmly to the tongue 11. It is designed for adjustment to various desired positions, depending on the length of the boat and the way it balances on the trailer. This upright member 27 is reinforced by a brace 31 and serves to support a winch 33 which can be adjusted up or down the member 27 to a convenient height, depending again on the type and size of the boat to be hauled. A stop member 35 is provided in the form of an arm adjustably attached to the upright member 27 and bearing a boat-contacting roller 37. This arm and roller can be adjusted as desired to serve as a stop for the front end of the boat.

Aside from its adjustability up and down the upright member 27, the winch is more or less conventional in type. It has a crank arm 39 which can be turned manually and the crank shaft has a small gear which is geared to a larger gear 41 on the shaft of the cable drum 43. A cable 45 thus is wound or unwound on the drum as required for operating the elevating mechanism which is to be described hereinafter. As shown in FIG. 1, cable 45 can be connected by a hook and eye connection 47 to another operating cable 49 which actually operates the elevating mechanism to be described. With this arrangement, the same winch 33 can be used to pull a boat onto the trailer by simply disconnecting its cable 45 from the elevator cable 49, after the trailer has been lowered to boat receiving position, and attaching the cable 45 to a hook or other connection 51 on the front end of the boat. Thus, the winch 35 preferably serves a double purpose but separate winches can be provided where this is preferred.

The cable 49, which serves to operate the elevator mechanism, has one end attached at 55 to an adjustable block or clamp member 57 which can be firmly secured to the tongue 11 at any desired position along its length which is convenient for the length of the boat and for operation of the elevator mechanism. This block 57 also includes a spring operated safety lock pin 59 adapted normally to be held in the in or locked position as it is inserted through a hole provided in a slidable lock bar 61. Referring to FIG. 8, these parts are shown in greater detail. The slide bar 61 is attached at its rear end to a rocker arm 65 which will be described more fully below. The latter is rocked about its pivot 67 by means of a pulley 69 attached through links 71 to the lower end of the rock arm 65. Obviously, pulling of the cable 49 around pully 69 to rock lever 65 counterclockwise pushes the rod 61 ahead, i.e., to the right in FIGS. 1 and 8. In normal operation, the spring actuated pin 59 is pressing against the face of bar 61, e.g., the rear face as seen in FIGS. 1 and 8, but when the opening in bar 61 comes opposite the pin, the latter springs into place in this opening. This firmly locks the rocker arm 65 in the position shown in FIG. 8, which is in the high or elevated position of the trailer. The linkage mechanism for raising and lowering the trailer will now be described.

Rocker arm 65 is fixed on a rotatable transverse shaft 75 whose axis is its center line or pivot axis 67. This shaft is journaled in a lubricated bearing 77 which is firmly mounted on a clamp block or bracket 78. This bracket 78 fits the tongue 11 smoothly and is firmly clamped, or if adjustability is not needed, may be welded thereto. This part may be made adjustable along the tongue to accommodate various types of boats and other loads. Shaft 75 has the crank arm 65 fixed to one end as already mentioned, and on its opposite end has a shorter arm 78 similarly fixed. See FIGS. 1 and 2.

At its lower or remote end from shaft 75, arm 79 is connected through a link 81, a shock absorbing device 83, and another link 85, to a downwardly extending arm 87 which is fixed through a collar 89 to rockable axle shaft 91. See FIG. 2. Axle shaft 91 is journaled in a bearing 93 attached to the near side frame member 13, as seen in FIG. 2 and its other end is journaled and axially adjustable in a bearing member 95 secured through a bracket 97 of inverted U-shape to the longitudinal frame member 21. Lateral shifting of the axle 91 in bearings 93 and 94 is prevented by adjustable collar members 98 and 99 attached by set screws to the axle. The first is placed adjacent to bearing 93. As shown best in FIG. 3, collar member 99 also bears a pair of spaced parallel arms 100, 101 which carry a rotatable wheel or roller 103 journaled on a pin 105 fixed in these arms. The arrangement is such that when axle shaft 91 is rotated about its axis by arm 87, roller 103 is raised or lowered to operate a boat lifting mechanism described below. See FIG. 7 where the parts are shown in larger scale. Roller 103 thus becomes a lifting cam or operator to raise a subframe described below.

Similarly, the independent transverse axle 110, which is in axial alignment with member 91, bears a collar 111 carrying operating arm 113 adapted to be moved by links 115 and 117. The latter are connected together by a shock absorbing member 119. These parts are shown best in FIG. 2. A transverse rigid stop bar 116 fixed to frame member 21 limits forward motion of arms 87 and 113 and prevents the ground wheels from buckling under when the trailer is moved backwards.

The shock absorbing members 83 and 119 preferably are of the type shown in larger scale and greater detail in FIG. 9. Here the member 83 is shown as being made up of a highly elastic rubber block member which includes and surrounds an embedded cable or chain elements of strong tensile strength. The latter are indicated at 120 and 121. Eyelets 122 and 123 of strong metal extend from either side of the rubber block and are linked into the strong tensile members 120 and 121 so that in case the rubber should deteriorate or rupture there still would be a strong tensile cable or chain connecting the operating links 81 and 85. Variations in tension applied to the link 85 for example by a ground wheel such as 130 attached to axle 91 as it goes over rough roads will cause alternate contraction and expansion of the rubber block 83. This gives resilience to the boat carriage. The described shock absorber device 83 (or 119) per se is of known type and forms no part of the present invention, except that its inclusion in the linkage to absorb shock over rough roads is an important aspect. As best shown in FIG. 3, the axle 91 terminates outside the frame member 13 in a crank arm 127 and arm 127 ends in a stub axle 129 on which a ground wheel 130, preferably equipped with a rubber tire is attached, as shown in FIG. 2. A fender 131 is supported above wheel 130 by one or more brackets attached to crank arm 127. See below.

Similarly, the other stub axle 110 has a crank arm 133 which terminates in a stub axle 135 supporting the wheel 136, similar to wheel 130. The arrangement thus is such that the two axles 110 and 91 are journaled at their inner ends in the lubricated bearing 95 attached through the U-shaped channel member or through bracket 97 rigidly and firmly to the base member 21 of the main frame. The fender 131 is supported on crank arm 127 by brackekt 132. By adjusting the collar members 98 and 99 bracket the axle, to which they are attached by strong set screws, the position of the inner end of axle 91 can be adjusted a few inches in either direction. Likewise, axle 110 can be adjusted so that its end projects to a greater or lesser distance within the bearing 95 by releasing set screws and adjusting the collars 137 and 142 along this axle in the same manner that collars 98 and 99 are adjusted. Collar 137, as best seen in FIG. 7, has arms 138 and 139 identical with arms 100 and 101 which support a rotatable wheel on roller 140 through a pin 141. Since collars 137 and 99 are firmly attached to their respective axles 110 and 91, rotation of these axles rotates the arms 100, 101 and 138 139 and causes the rolls 103 and 140 to be raised or lowered as wheels 130 and 136 are raised or lowered. See FIGS. 3, 4 and 7, as well as FIGS. 1 and 2. At its outer end, axle 110 is journaled in lubricated bearing 143 attached to the far side frame member 13, FIG. 2. See also FIG. 3.

Attached to the rear frame member 15 are a pair of upright posts 151 and 152 which can be adjusted up or down, depending on the contour and size of the boat. They can also be adjusted transversely on the trailer along member 15 if desired. Each of these has a forked upper end in the form of a pair of spaced pivot plates 153 forming a mount, see FIG. 1, in which is pivotally mounted a bolster 155 having its top surface padded at 157. Similarly attached to the transverse frame member 17 farther to the front of the trailer are upright posts 157 in which other bolsters 158 and 159 are pivotally mounted for supporting the boat for travel and at a height as required to clear other parts of the trailer. These bolsters 158 and 159 can be adjusted individually up or down and/or transversely of frame member 17 to fit boats of different sizes or shapes, as will be obvious. Ordinarily, the bolsters 155, 157 and 158 will be adjusted to support the boat during travel just above and clear of the temporary hinged lifting mechanism or subframe in its lowered position. This lifting mechanism and subframe will now be described.

The lifting mechanism comprises an elongated unitary frame made up of angle side bars 160 and 161 interconnected by two or more transverse member 162 and 163. In the vertical legs of the angle side bars and near their top edges are journaled a plurality of rollers, preferably three as shown at 165, 167 and 169, FIGS. 1, 2 and 5. The rear ends of the side bars 160 and 161 are pivoted respectively to angle brackets 170 and 171 attached to the rear frame member 15. The front ends of these angle bars are adapted to rest on adjustable vertical screws 173 secured through an appropriate frame member or bracket and equipped with a locking nut 175 to hold them in proper adjusted height. With this arrangement, rollers 165 and 167 and 169 normally lie just below the position of contact with the boat when the boat is supported in the bolsters 155, 157 and 158. The front ends of bars 160 and 161 respectively lie directly over the rollers 103 and 140 as shown in FIGS. 3 and 7 and already described. See also FIG. 4. When the arms 87 and 113 are operated to rotate the shafts 91 and 110, respectively, and thus to raise the wheels 130 and 136 with respect to the trailer frame, that is, to lower the frame with respect to the ground, the wheels or cam rollers 103 and 140 are raised by their respective arms to lift the sub-frame and raise rollers 165, 167 and 169 into contact with the bottom of the boat. That is, the subframe 160, 161, etc., pivots about its rear pivot axis. As this operation is continued, the boat is lifted by the rollers just mentioned until it is clear of the bolsters and is ready to roll towards the rear on these three rollers. Meanwhile, since the trailer frame has been lowered into the dotted line position L, see FIG. 4 for greater detail, the boat is now resting on an incline and is ready to be lowered into the water. Meanwhile, the cable 45 of winch 33 will have been attached to the eyelet 51 on the front of the boat or, if desired, the boat is attached so some other winch mechanism which may be used to allow the boat to go downhill, on rollers 165, 167 and 169 into the water. For most launching operations, the boat can be placed all the way into the water by backing up the trailer to the water's edge; in many cases it can be backed still farther into the water, if desired.

Conversely, for pulling the boat out of the water, the trailer is backed into the water so that the front end of the boat can be placed on the first roller 165. To assist in this, an additional roller 181 is shown journaled in brackets 183 attached to the rear frame member 15 of the pivoted subframe. With this arrangement, using a cable 45 and winch or other equivalent pulling mechanism, the boat is drawn up onto the trailer riding onto the three rollers in the subframe in succession and proceeding forward until it reaches the stop position against stop roller 37 at the front end of the trailer. Thereafter, the trailer is raised off the subframe by operating cable 49 and arms 79 and 65, which have the same radial length at their points of attachment to links 81 and 117. The axle 91 and 110 are rocked about their axes or mutual center line to depress the ground wheels 130 and 136 and thus raise the trailer frame into traveling position. As this is done, the safety locking bar 61, attached to an intermediate point 185 of arm 65, is pushed forward, sliding through bracket 57 with the spring pressed pin 59 pressing against its rear face until the locking pin snaps into place in the opening and locks the mechanism 65, 87, etc., in high travel position.

To hold the boat steady on the trailer during travel, side arms 186 are secured to the rear corners of the main frame. They are shown as extending nearly vertically with an outward flare. These are adjustably attached so that their angle alongside the boat can be varied to accommodate boats of various widths. Each arm 186 has a forked or upper or outer end 187 in which a soft roller 188 is journaled. See FIGS. 1 and 2. Also, as shown in FIG. 5, a tail light 189 is attached to each of these side arms. Rollers 188 may be mounted on horizontal axes as in FIGS. 1 and 2 or on inclined axes as in FIG. 5. In the latter case the brackets 187a replace 187 to hold rollers 188a. These rollers contact the sides of the boat to steady it during travel and give guidance during launching or reloading.

In FIG. 6, there is shown a modification trailer having four wheels. This is merely an analogous arrangement for larger boats where more than two support wheels are desirable or necessary. The frame structure is essentially the same as in FIGS. 1 and 2 but it may be somewhat heavier and preferably has additional cross-members. The longitudinal intermediate frame member, which may be a one-piece tongue, preferably extends nearly or completely the full length of the trailer for greater rigidity. Thus, the frame shown consists of the tongue 190, side frame members 191 and 192, near frame member 192, transverse frame members 194, 195, and additional members if required, which are not shown. The individual axles for each of the four wheels are shown respectively at 196, 197, 198 and 199. They are journaled separately and independently in the frame, in the same manner as axles 91 and 110, FIGS. 1 and 2. The axles each are operated by individual links 201, 202, 203 and 204; each link has a shock absorbing element 205 similar to unit 83, FIG. 9, connected to one branch of an equalizer bar 206 or 207. These bars are connected, in turn, to links 208 and 209 which are attached to and operated by arms identical in every respect, except for size, with the arms 65 and arm 79 described above. In this case, the arms are fixed to a cross shaft 210 which is mounted in a bracket secured to the tongue member 190. The operating winch and associated mechanism are the same as in the other figures except they may be stronger or heavier, or with greater pull-multiplying factors, if required by the weight of the boat to be handled.

Anti-friction rollers 213, 214 and 215 are journaled in brackets attached to the respective transverse frame members 193, 194 and 195. An additional roller 217 is provided near the front end of the trailer on tongue 190 to support the front end of the boat. This feature is optional. Some of these rollers may be omitted or others may be added or substituted to suit particular boats, as will be obvious.

In the construction of FIG. 6, lifting rollers are provided to raise the boat off travel bolsters. Thus, rollers 221 and 223 are shown mounted in arms 225 on axles 196 and 197, respectively, and on the arms 227 and 228 on axles 198 and 199, respectively. These two rollers serve the same general purpose as the subframe lifting assembly 160, 161 and rollers 165, 167 and 169 described above in connection with the other figures of the drawings. They are effective when raised above normal positions to lift the boat off the bolsters which, in FIG. 6, are shown at 220 and 231. The arrangement just described, where the lifting rollers are operated directly by the rocking axles, can be used in many cases, but in general, the construction shown in FIGS. 1 and 2 with the separate pivoted lifting frame and its three (or more) rollers is preferred for raising the boat off its bolsters preparatory to launching or for pulling it up out of the water during loading.

While specifically described for use with boats, this trailer can also be used for loads other than boats, such as: stock, road equipment, and various other things.

It will be obvious to those skilled in the art that various other modifications and changes in addition to those mentioned above may be made in the construction and operation of the trailer without departing from the spirit and purpose of the invention. It is intended by the claims which follow to cover these and other alternatives and variations, which will suggest themselves to those skilled in the art, as broadly as the state of the prior art properly permits.

What is claimed is:

1. A wheel-mounted trailer capable of being raised and lowered with respect to its wheels between a low unloading position and a high travel position which comprises, in combination, a main frame extending longitudinally, a pair of separate and independently rotatable axle units mounted in bearings secured to said main frame and extending transversely thereof and in mutual axial alignment with each other, each of said axle units including at its outer end a radial arm terminating in a stub axle, a wheel for support of the trailer mounted on each said stub axle, each of said axle units having also a radial operating arm secured thereto, a rocker unit mounted in bearings on said main frame for rotation about an axis parallel to said axle units, a separate linkage means each including a resilient shock absorber connecting said rocker unit to each of said axle operating arms, actuating means for rotating the rocker unit and thereby rotating the axle units about their axes to raise the main frame with respect to the wheels, and means for locking the rocker unit when the frame is raised to said high travel position.

2. A trailer according to claim 1 which includes a longitudinally extending subframe pivoted as its rear end to the main frame and bearing a plurality of load supporting rollers, separate bolsters mounted on said main frame and adapted to support the load during travel of said trailer, and means operable by rotation of said axle units to raise said subframe about its pivot and thereby transfer the load from said bolsters to said rollers when the axle units are rotated to said low unloading position.

3. A trailer according to claim 2 in which the separate axle units each bear lifting arms and wherein the lifting arms bear means for contacting and lifting the subframe as the main frame is lowered.

4. A trailer according to claim 3 wherein each of said contacting means is a rotatable wheel or roller rotatably mounted on lifting arms associated with a particular axle.

5. A trailer according to claim 1 which comprises plural ground wheels arranged in tandem on each side of the trailer with a separate rotatable axle unit for each wheel and a separate linkage for rotating each axle unit in its bearings.

6. A trailer according to claim 5 in which each axle unit is arranged to operate a lifting mechanism to take part in raising the load above its normal travel position with respect to the trailer.

7. A trailer according to claim 1 which includes lock mechanism comprising an opening which comes into a lock position as the trailer is raised to its high travel position, and a spring-pressed pin located at said lock position and means for causing said pin to snap into said opening when travel position is reached.

8. A trailer according to claim 1 which comprises an upwardly extending post attached to the main frame, a manually operable winch secured to said post, and a cable on said winch selectively attachable to said rocker unit to raise the trailer to travel position or to a boat for pulling the boat onto the trailer.

9. A trailer according to claim 1 in which the rocker unit comprises a transverse rocker shaft, a bearing for said shaft secured to the trailer frame, and a separate operating arm on each end of said shaft for operating at least one of said axle units.

10. A trailer according to claim 1 in which the resilient shock absorber in each linkage comprises a deformable elastic block containing elements of high tensile strength which allow substantial deformation of the block without fracture.

* * * * *